United States Patent
Kurian et al.

(10) Patent No.: US 10,462,140 B2
(45) Date of Patent: Oct. 29, 2019

(54) DATA TRANSMISSION AUTHENTICATION AND SELF-DESTRUCTION

(71) Applicant: Bank of America Corporation, Charlotte, NC (US)

(72) Inventors: Manu Kurian, Dallas, TX (US); Paul Roscoe, Treuddyn Flintshire (GB)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 15/582,049

(22) Filed: Apr. 28, 2017

(65) Prior Publication Data

US 2018/0316494 A1 Nov. 1, 2018

(51) Int. Cl.
| | |
|---|---|
| H04L 29/08 | (2006.01) |
| H04L 9/00 | (2006.01) |
| H04L 12/28 | (2006.01) |
| G06F 21/00 | (2013.01) |
| H04L 29/06 | (2006.01) |

(52) U.S. Cl.
CPC .......... H04L 63/10 (2013.01); H04L 63/0428 (2013.01)

(58) Field of Classification Search
None
See application file for complete search history.

(56) References Cited

U.S. PATENT DOCUMENTS

| | | | |
|---|---|---|---|
| 6,246,771 B1 | 6/2001 | Stanton et al. | |
| 6,615,264 B1 | 9/2003 | Stoltz et al. | |
| 7,421,741 B2 | 9/2008 | Phillips, II et al. | |
| 7,885,413 B2 | 2/2011 | Vasic et al. | |
| 7,904,945 B2 * | 3/2011 | Zheng | H04L 63/08 726/11 |
| 7,979,697 B2 | 7/2011 | Phillips, II et al. | |
| 8,402,558 B2 | 3/2013 | Phillips, II et al. | |
| 8,930,697 B2 | 1/2015 | Phillips, II et al. | |
| 9,077,525 B2 | 7/2015 | Chandran et al. | |
| 9,191,376 B2 | 11/2015 | Phillips, II et al. | |
| 9,544,297 B2 | 1/2017 | Resnitzky et al. | |
| 9,544,314 B2 | 1/2017 | Gregg et al. | |

(Continued)

OTHER PUBLICATIONS

Khan, Kaleemullah, and Muhammmad Akbar. "Authentication in multi-hop wireless mesh networks." Transactions on engineering, computing and technology 16 (2006): 178-183. (Year: 2006).*

(Continued)

*Primary Examiner* — Alexander Lagor
(74) *Attorney, Agent, or Firm* — Banner & Witcoff, Ltd.; Michael A. Springs

(57) ABSTRACT

Systems, methods, and apparatus for data transmission authentication and self-destruction are disclosed. An example method comprises receiving, by a computing device associated with a first token, communications, determining, by the computing device, whether the first token is associated with a second token within the communications, wherein the second token is configured to authorize the computing device to process the communications, processing, by the computing device and in response to determining that the first token is associated with the second token, the communications, and destructing, by the computing device and in response to determining that the first token is not associated with the second token, the communications.

20 Claims, 7 Drawing Sheets

(56) References Cited

U.S. PATENT DOCUMENTS

2003/0131060 A1* 7/2003 Hartselle .............. G06Q 10/107
709/206
2016/0344729 A1* 11/2016 Slaight .................. H04L 63/061

OTHER PUBLICATIONS

John Markoff, New Technology to Make Digital Data Self-Destruct, The New York Tiimes, Jul. 20, 2009, retrieved from Internet, http://www.nytimes.com/2009/07/21/science/21crypto.html.
Self-Destruct, Wikipedia, The Free Encyclopedia, retrieved from Internet Apr. 24, 2017, https://en.wikipedia.org/wiki/Self-destruct.

* cited by examiner

DATA TRANSMISSION AUTHENTICATION AND SELF-DESTRUCTION

TECHNICAL FIELD

Aspects of the present disclosure generally relate to processes, systems, and apparatus for authentication of systems involved in data transmission and self-destruction of data in unauthenticated systems.

BACKGROUND

Data communications are often secure, confidential, or otherwise privileged. It is often preferred that only authorized computing devices be able to process such data communications. However, data communications may be inadvertently sent to unauthorized systems, may traverse a data path comprising an unauthorized system, may be intercepted by a malicious entity, etc.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure concern determining the authentication of computing devices using one or more token modules and tokens and causing the self-destruction of data communications in unauthorized systems.

An example system comprises a first computing device, a second computing device, and at least one network device configured to facilitate communications between the first computing device and the second computing device, wherein the at least one network device comprises at least one processor and wherein the communications comprise instructions that, when executed by the at least one processor, cause the at least one network device to determine whether the at least one network device comprises a token associated with a token chain within the communications, wherein the token chain is configured to authorize the at least one network device to process the communications, in response to determining that the token is associated with the token chain, process the communications, and in response to determining that the token is not associated with the token chain, destruct the communications.

An example apparatus comprises at least one processor, a first token configured to authorize the apparatus to receive communications from a first computing device, and a device controller configured to receive, from the first computing device, the communications, wherein the communications comprise instructions, that when executed by the at least one processor, cause the apparatus determine whether the first token matches a second token within the communications, in response to determining that the first token matches the second token, insert a third token into the communications, wherein the third token is configured to authorize a second computing device to receive the communications from the apparatus, and forward the communications to the second computing device, and in response to determining that the first token fails to match the second token, destruct the communications.

An example method comprises receiving, by a computing device associated with a first token, communications, determining, by the computing device, whether the first token is associated with a second token within the communications, wherein the second token is configured to authorize the computing device to process the communications, processing, by the computing device and in response to determining that the first token is associated with the second token, the communications, and destructing, by the computing device and in response to determining that the first token is not associated with the second token, the communications.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Aspects of the present disclosure pertain to the self-destruction of data communications in unauthorized systems. As disclosed herein, the data communications are transmitted with one or more tokens and instructions that may be executed by a system when the system attempts to access the data communications. As used herein, a token may include a random string of characters (e.g., numbers, letters, symbols, etc.) of varying length and/or complexity. The one or more tokens may be associated with each other to form a token chain, which may define a path of authorized systems for transmission through a network. The instructions may determine whether a system is authorized to receive and/or process the data communications and may cause the destruction of the data communications when such a system is determined to be unauthorized.

Figure 1:
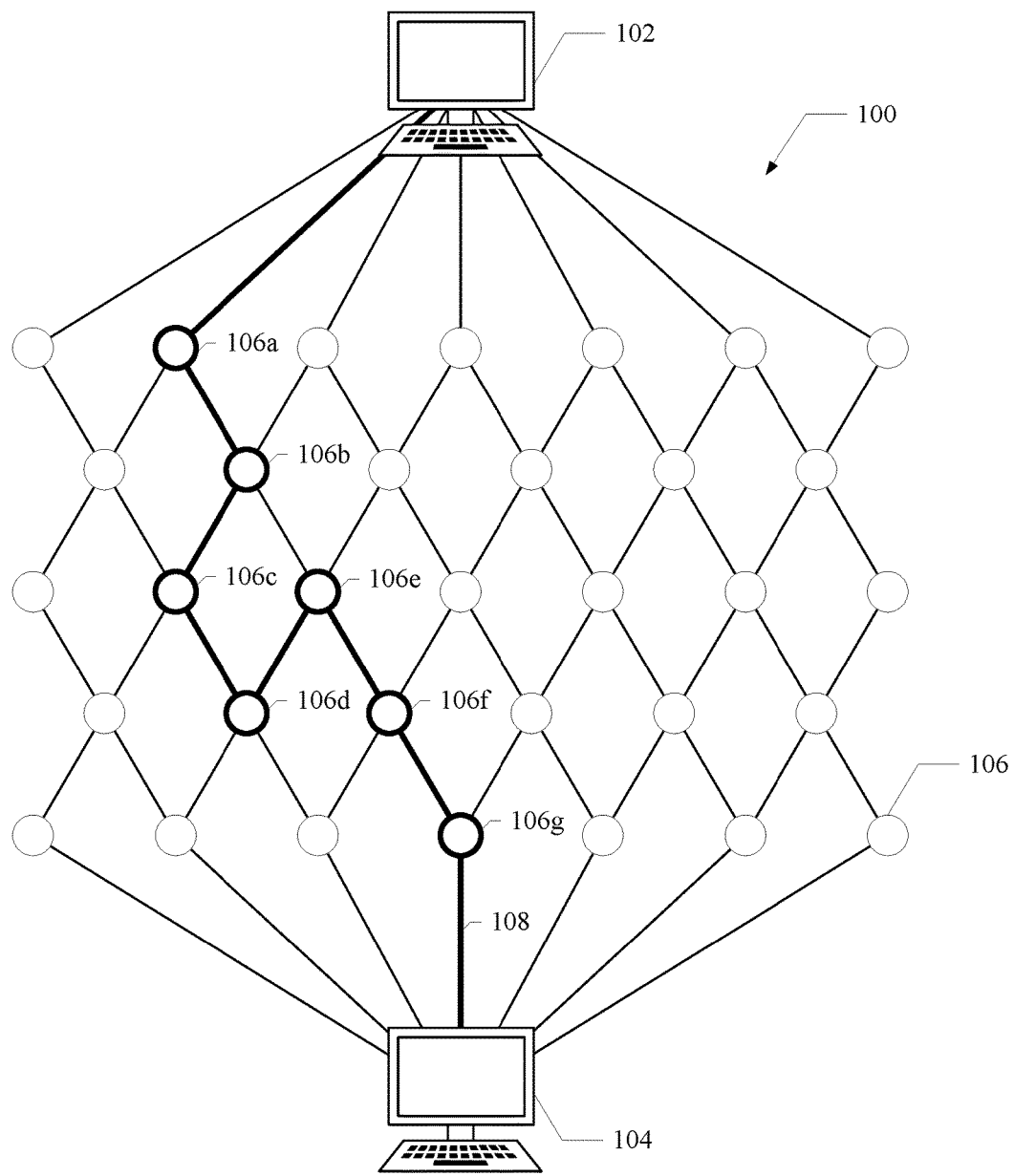
FIG. 1 illustrates an example environment comprising a network for facilitating communications from a first device to a second device.

FIG. 1 illustrates an example mesh network 100 through which a first computing device 102 and a second computing device 104 are to communicate. The example mesh network 100 may include any number of network devices or nodes 106 through which data communications may "hop" to arrive at a particular destination. The example network devices or nodes 106 may be computer servers configured for facilitating communication between multiple devices. In the illustrated example of FIG. 1, data communications are transmitted from the first computing device 102 through a first node 106a, a second node 106b, a third node 106c, a fourth node 106d, a fifth node 106e, a sixth node 106f, a seventh node 106g, and to the second computing device 104.

Such a transmission forms a data path 108 between the first computing device 102 and the second computing device 104.

Each node 106 of the example mesh network 100 may process data communications that it receives. Such processing may include decrypting the data communications, reading the data communications, editing the data communications, encrypting the data communications, forwarding the data communications to another node 106 or the second computing device 104, etc.

Figure 2:
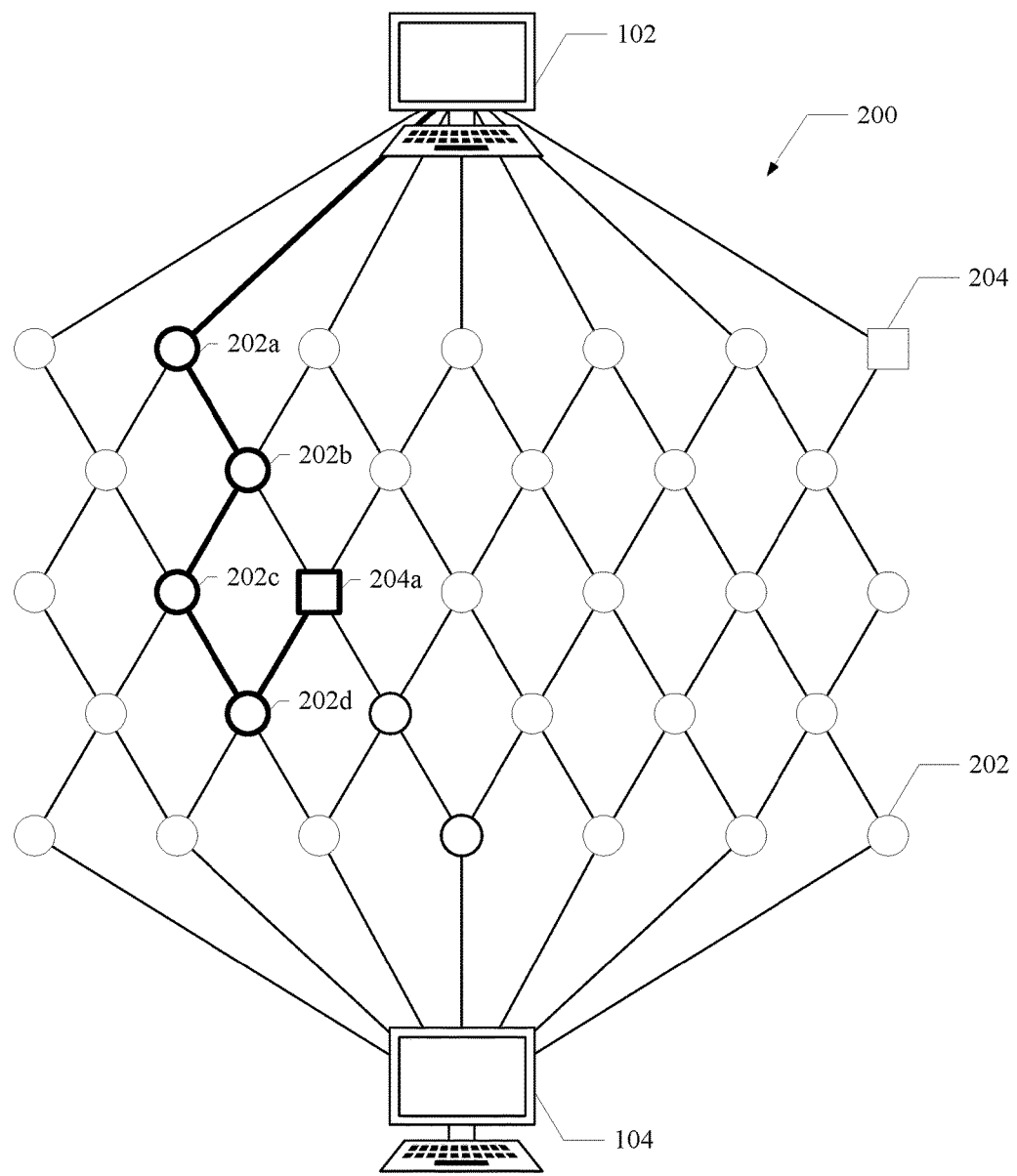
FIG. 2 illustrates an example environment with an unauthorized system within a network for facilitating communications from a first device to a second device.

FIG. 2 illustrates an example mesh network 200 through which the first computing device 102 and the second computing device 104 are to communicate. The example mesh network 200 may include any number of authorized nodes 202 and any number of unauthorized nodes 204 through which data communications may "hop" to arrive at a particular destination. In the illustrated example of FIG. 2, data communications are transmitted from the first computing device 102 through a first authorized node 202a, a second authorized node 202b, a third authorized node 202c, a fourth authorized node 202d, and a first unauthorized node 204a.

The unauthorized node 204a may obtain the data communications accidently. Additionally, or alternatively, the unauthorized node 204a may be a malicious entity attempting to intercept the data communications. The example systems, methods, and apparatus disclosed herein prevent access of the data communications to unauthorized nodes to maintain confidentiality of the data communications.

An example system for ensuring unauthorized entities do not access data communications comprises the first computing device 102, the second computing device 102, and at least one node 106 configured to facilitate communications between the first computing device 102 and the second computing device 104, wherein the at least one node 106 comprises at least one processor and wherein the communications comprise instructions that, when executed by the at least one processor, cause the at least one node 106 to determine whether the at least one node 106 comprises a token associated with a token chain within the communications, wherein the token chain is configured to authorize the at least one node 106 to process the communications, in response to determining that the token is associated with the token chain, process the communications, and in response to determining that the token is not associated with the token chain, destruct the communications.

In some examples, the first computing device 102 comprises a first module configured to use a same rotating cypher to alter the token chain and the at least one node 106 comprises a second module configured to use the same rotating cypher to alter the token.

In some examples, the instructions, when executed, cause the at least one node 106 to, in response to determining that the token is not associated with the token chain, record a network address of the at least one node 106.

In some examples, the instructions, when executed, cause the at least one node 106 to, in response to determining that a first portion of the token is associated with the token chain and a second portion of the token is not associated with the token chain, partially process the communications.

In some examples, the token is a first token and wherein the at least one node 106 comprises a module configured to insert, into the communications and in response to determining that the first token is associated with the token chain, a second token.

In some examples, the second computing device 104 is configured to determine whether the second computing device 104 comprises a third token associated with either the token chain or the second token, in response to determining that the second token is associated with either the token chain or the second token, process the communications, and in response to determining that the second token is not associated with either the token chain or the second token, destruct the communications.

An example apparatus for communicating authorized data communications comprises at least one processor, a first token configured to authorize the apparatus to receive communications from the first computing device 102, and a device controller configured to receive, from the first computing device, the communications, wherein the communications comprise instructions, that when executed by the at least one processor, cause the apparatus determine whether the first token matches a second token within the communications, in response to determining that the first token matches the second token, insert a third token into the communications, wherein the third token is configured to authorize a second computing device to receive the communications from the apparatus, and forward the communications to the second computing device, and in response to determining that the first token fails to match the second token, destruct the communications.

In some examples, the instructions, when executed by the at least one processor, cause the apparatus to insert the third token into at least one of a header or a footer of the communications.

In some examples, the communications comprise a plurality of data blocks, wherein the first token comprises a plurality of data tokens, and wherein each data block of the plurality of data blocks is associated with a corresponding data token of the plurality of data tokens.

In some examples, the first token comprises a time limit corresponding to how long the apparatus is authorized to receive the communications from the first computing device.

In some examples, the communications are encrypted with the second token.

In some examples, the instructions, when executed by the at least one processor, further cause the apparatus to attempt to decrypt the communications with the first token as a decryption key, determine, in response to successful decryption of the communications, that the first token matches the second token, and determine, in response to unsuccessful decryption of the communications, that the first token fails to match the second token.

An example method comprises receiving, by a computing device associated with a first token, communications, determining, by the computing device, whether the first token is associated with a second token within the communications, wherein the second token is configured to authorize the computing device to process the communications, processing, by the computing device and in response to determining that the first token is associated with the second token, the communications, and destructing, by the computing device and in response to determining that the first token is not associated with the second token, the communications.

In some examples, the method further comprises initializing the first token and the second token with a same rotating cypher.

In some examples, the method further comprises inserting, into the communications and in response to determining that the first token is associated with the second token, a third token.

In some examples, the second token comprises at least one data token and the method further comprises, processing, by the computing device and in response to determining that the first token is associated with the at least one data token, a portion of the communications corresponding to the at least one data token.

In some examples, the processing the communications comprises at least one of decrypting the communications, reading the communications, editing the communications, encrypting the communications, forwarding the communications to a second computing device, or any combination thereof.

In some examples, the second computing device sends the communications to the computing device for processing or destruction and the computing device returns the communications to the second computing device after processing.

In some examples the communications are first communications and the method further comprises receiving, by the computing device, second communications, determining, by the computing device, whether a third token stored by the computing device is associated with a fourth token within the second communications, wherein the fourth token is configured to authorize the computing device to process the second communications, processing, by the computing device and in response to determining that the third token is associated with the fourth token, the second communications, and destructing, by the computing device and in response to determining that the third token is not associated with the fourth token, the second communications.

In some examples, the method further comprises, prior to determining whether the first token is associated with the second token within the first communications, determining, by the computing device and, whether the third token stored by the computing device is associated with the second token within the first communications, processing, by the computing device and in response to determining that the third token is associated with the second token, the first communications, and increasing, by the computing device and in response to determining that the third token is not associated with the second token, a maximum attempt counter, wherein the determining whether the first token is associated with the second token within the first communications occurs in response to the increasing the maximum attempt counter.

Figure 3:
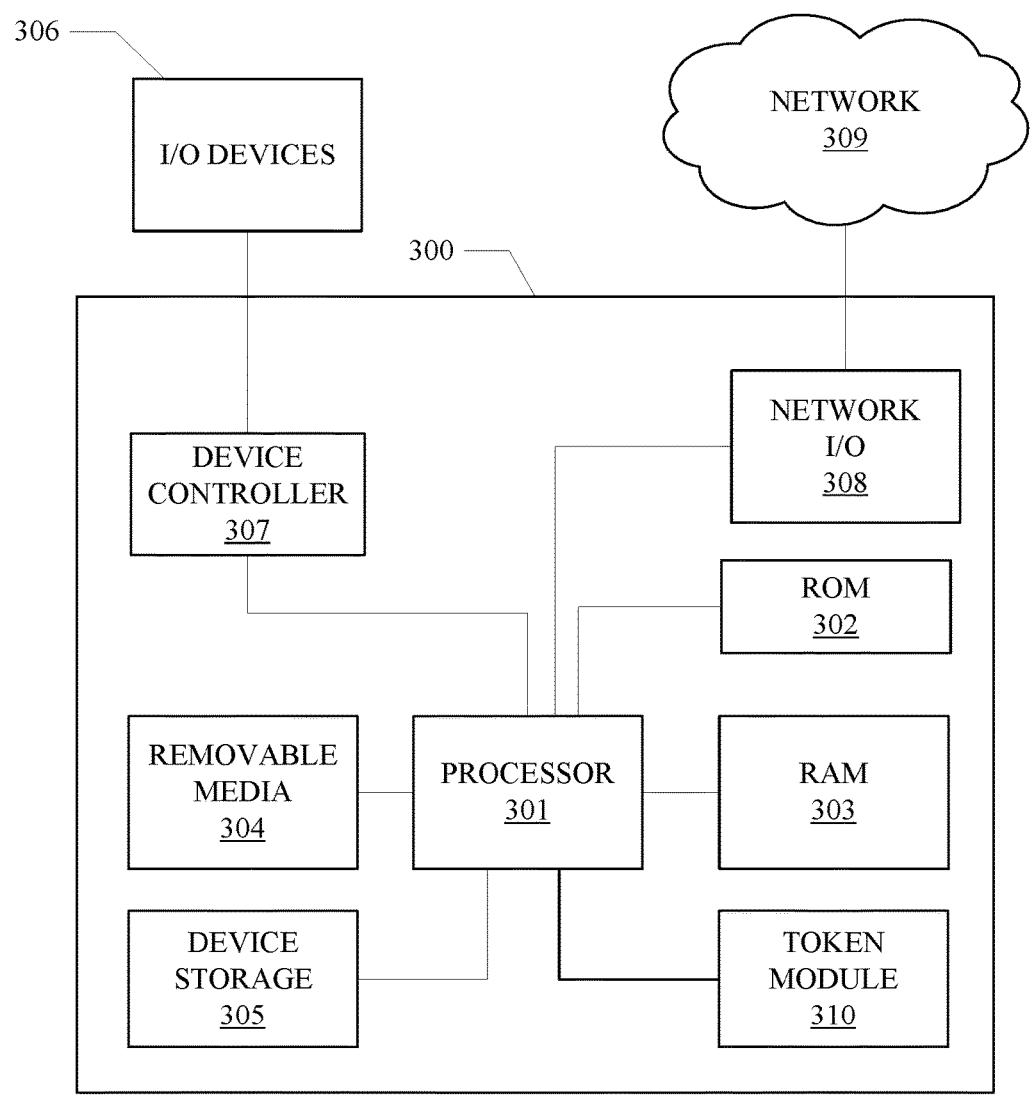
FIG. 3 illustrates an example computing device specifically configured to at least perform the methods of FIGS. 5-7.

The example computing devices described herein, such as, for example, the first computing device 102, the second computing device 104, the network devices or nodes 106, and/or other computing devices described herein may be implemented via a hardware platform such as, for example, the computing device 300 illustrated in FIG. 3. Some elements described with reference to the computing device 300 may be alternately implemented in software. The computing device 300 may include one or more processors 301, which may execute instructions of a computer program to perform any of the features described herein. The instructions may be stored in any type of tangible computer-readable medium or memory, to configure the operation of the processor 301. As used herein, the term tangible computer-readable storage medium is expressly defined to include storage devices or storage discs and to exclude transmission media and propagating signals. For example, instructions may be stored in a read-only memory (ROM) 302, random access memory (RAM) 303, removable media 304, such as a Universal Serial Bus (USB) drive, compact disk (CD) or digital versatile disk (DVD), floppy disk drive, or any other desired electronic storage medium. Instructions may also be stored in an attached (or internal) hard drive 305. The computing device 300 may include one or more input/output devices 306, such as a display, touch screen, keyboard, mouse, microphone, software user interface, etc. The computing device 300 may include one or more device controllers 307 such as a video processor, keyboard controller, etc. The computing device 300 may also include one or more network interfaces 308, such as input/output circuits (such as a network card) to communicate with a network 309 such as the example mesh network 100, the example mesh network 200, etc. The network interface 308 may be a wired interface, wireless interface, or a combination thereof. Each authorized computing device described herein (e.g., the first computing device 102, the second computing device 104, the authorized nodes 202) may comprise a token module 310. One or more of the elements described above may be removed, rearranged, or supplemented without departing from the scope of the present disclosure.

The token module 310 may comprise one or more tokens configured to authorize a particular computing device to process communications from one or more other computing devices. In some example, the existence of a token module 310 at a particular device is an initial check to determine whether received communications are at an authorized location. The token module 310 may further facilitate comparison of the one or more tokens of the token module 310 with tokens within a data communication in order to validate the authorization determined by the existence of the token module 310. For example, a system may be authorized to receive data communications generally, but not authorized to process a particular type of data communications. In another example, a malicious entity may have obtained the one or more tokens configured to authorize a particular computing device to process communications, however may not include a token module 310. In such examples, and the examples discussed further below, the disclosed systems, methods, and apparatus, prevent unauthorized systems from processing data communications.

An initial check may be performed by a receiving system (e.g., the first node 106a) upon receipt of the data communications and the instructions therein. For example, the instructions, when executed, may cause the first node 106a to check for a token module 310. The instructions, when executed, may cause the first node 106a to verify an identity, fingerprint, entitlement, authorization, etc.

Thereafter, the example token module 310 authenticates the first node 106a based on a comparison of the one or more tokens within the token module 310 and the one or more tokens within the data communications. The example token module 310 may search the data communications for the one of more tokens stored by the token module 310. For example, if the token module 310 has a token "w4&Z," the token module 310 may search the data communications for "w4&Z." Alternatively, the token module 310 may attempt to decrypt the data communications using "w4&Z" as a decryption key. Other methods of determining whether the token module 310 comprises a same token as the data communications may be utilized, as would be known to one of ordinary skill in the art. Of course, the tokens described herein may have any length and may vary in complexity.

As disclosed herein, the data communications may include tokens within the communications themselves. The communication tokens may be injected into a header and/or footer of the data communications. The communication tokens may be injected into the data such that the tokens are hidden from unauthorized systems. For example, the communication tokens may be inserted within data strings. Each communication token may be concatenated together such that it may be difficult to determine where one token ends and the next token begins. However, the example token module 310 may be configured to identify such hidden communication tokens by using its own token to search such a concatenated string.

The data communications may further include scripts, executable code, and/or more generally, computer readable instructions to be executed by any computing device attempting to process the data communications. The example instructions, when executed, may cause the accessing computing device to identify the existence of a token module 310, compare tokens of the token module 310 with tokens in the data communications, authenticate the data communication, authenticate the computing device, process the data communications, destruct the data communications, report authentication or destruction, insert additional tokens into the data communications, etc. In some examples, the instructions, when executed, cause the token module 310 of the accessing computing device to perform the above identified functions.

The one or more tokens of the token module 310 may each comprise a time-to-live (TTL) parameter corresponding to a length of time in which a particular computing device is authorized to process data communications. For example, a first entity may desire to eliminate access to data communications after a period of time because the data communications may be outdated after such period of time, the second entity should not have unlimited access to such data communications, the data communications are not complete, etc. Accordingly, the example token module 310 may determine, based on the instructions within the data communications, whether the TTL parameter of the tokens has expired.

The one or more tokens of each token module 310 within an authorized computing device may be initially synchronized with all other respective tokens within token modules 310 of other authorized computing devices. Each token module 310 may be synchronized together prior to installation of the token modules 310 in respective computing devices. For all computing devices that are to be authorized to process a first data communication, a same token may be utilized in each token module 310. Using the data path 108 of FIG. 1 as an example, the first computing device 102, the second computing device 104, and nodes 106a-g may each comprise the same token, such that the data communication is authorized and processed through nodes 106a-g from the first computing device 102 to the second computing device 104. The same token may vary over time according to a rotating cypher (which may be synchronized as well), such that all computing devices that are authorized to process the first data communication comprise the same token at the same time.

Alternatively, each one of nodes 106a-g may comprise a different token and the data communications may comprise a first token corresponding with the first node 106a. Upon successful authentication of the first node 106a, the first node 106a may insert, into the data communications, a second token corresponding with the second node 106b. Upon successful authentication of the second node 106b, the second node 106b may insert, into the data communications, a third token corresponding with the third node 106c, and so on and so forth. Accordingly, upon receipt of the data communications by any computing device, the series of tokens within the data communications by the previous nodes may form a token chain identifying the data path 108. Such a formation may be utilized to analyze success rates of data communication transmissions, frequency of a particular data path, identifying malicious entities along a data path, etc.

Figure 4A:
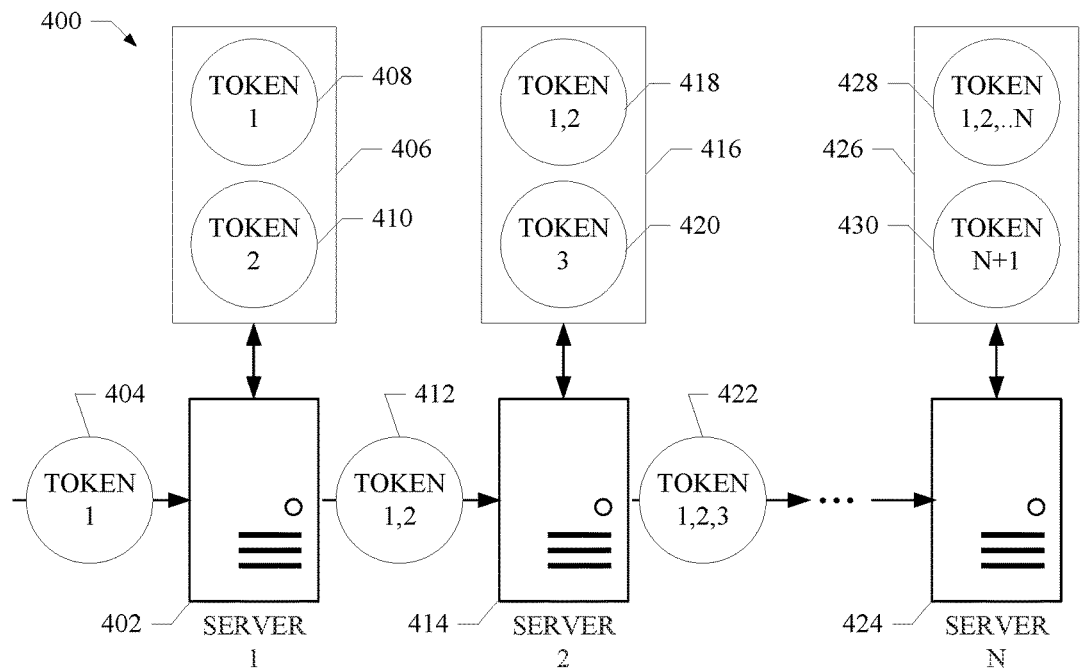
FIGS. 4A-4B illustrate example implementations of data authentication used by the disclosed systems, methods, and apparatus.

To accomplish the above description, the token module 310 may be configured to insert additional tokens into the data communications that the token module 310 processes. For example, as described below in connection with FIG. 4A, a first environment 400 includes a first server 402 that receives a first token 404 (e.g., token 1) in a data communication. The example first server 402 may comprise a corresponding token module 406, which may comprise a second token 408 (e.g., token 1) and a third token 410 (e.g., token 2). As described herein, the instructions in the data communications, when executed, may cause the token module 406 to determine whether the second token 408 is associated with the first token 404. In the illustrated example of FIG. 4A, the second token 408 (e.g., token 1) is associated with the first token 404 (e.g., token 1), such that the first server 402 is authenticated. Thereafter, the first server 402 may insert the third token 410 (e.g., token 2) into the data communication, such that the data communication now includes a first token chain 412 (e.g., token 1, 2). The first server 402 may forward or otherwise transmit the data communication with the first token chain 412 to a second server 414.

The second server 414 may receive the first token chain 412 (e.g., token 1, 2) in the data communication. The example second server 414 may comprise a corresponding token module 416, which may comprise a fourth token 418 (e.g., token 1, 2) and a fifth token 420 (e.g., token 3). As described herein, the instructions in the data communications, when executed, may cause the token module 416 to determine whether the fourth token 418 is associated with the first token chain 412. In the illustrated example of FIG. 4A, the fourth token 418 (e.g., token 1, 2) is associated with the first token chain 412 (e.g., token 1, 2), such that the second server 414 is authenticated. Thereafter, the second server 414 may insert the fifth token 420 (e.g., token 3) into the data communication, such that the data communication now includes a second token chain 422 (e.g., token 1, 2, 3). The second server 414 may forward or otherwise transmit the data communication with the second token chain 422 to a $n^{th}$ server 424.

As described herein, the $n^{th}$ server 424 may receive a token chain (e.g., token 1, 2, . . . N) in the data communication. The example $n^{th}$ server 424 may comprise a corresponding token module 426, which may comprise a $(2N-1)^{th}$ token 428 (e.g., token 1, 2, . . . N) and a $2N^{th}$ token 430 (e.g., token N+1). As described herein, the instructions in the data communications, when executed, may cause the token module 426 to determine whether the $(2N-1)^{th}$ token 428 is associated with the received token chain. In the illustrated example of FIG. 4A, the $(2N-1)^{th}$ token 428 (e.g., token 1, 2, . . . N) is associated with the received token chain (e.g., token 1, 2, . . . N), such that the $n^{th}$ server 424 is authenticated. Thereafter, the $n^{th}$ server 424 may insert the $2N^{th}$ token 430 (e.g., token N+1) into the data communication.

As described above, as the data communication is processed through each network device (e.g., first server 402, second server 414, $n^{th}$ server 424), a token chain is created. The token chain may be used to determine a particular data path that a data communication has traveled between the first computing device 102 and the second computing device 104. Additionally, in the illustrated embodiment of FIG. 4A, each network device (e.g., first server 402, second server 414, $n^{th}$ server 424) may know, based on its tokens, from which network device the data communications should come and to which network device the data communications should go. Accordingly, in an embodiment, each network device (e.g., first server 402, second server 414, $n^{th}$ server 424) may be able to identify unauthorized incoming data communications based on where the data communications are sent from.

Figure 4B:
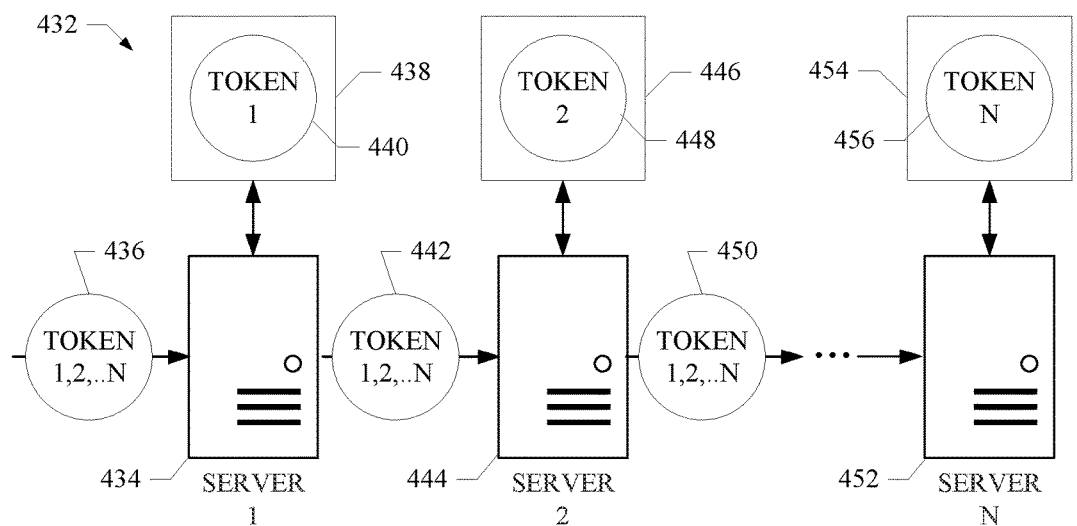

Alternatively, each one of nodes 106a-g may comprise a different token and the data communications may comprise a token chain with which at least the respective tokens for each one of nodes 106a-g corresponds. For example, the respective token modules 310 may check whether the one or more tokens of the respective token module 310 correspond with one or more tokens within the token chain. As described below in connection with FIG. 4B, a second environment 432 includes a first server 434 that receives a token chain 436 (e.g., token 1, 2, . . . N) in a data communication. The example first server 434 may comprise a corresponding token module 438, which may comprise a first token 440 (e.g., token 1). As described herein, the instructions in the data communications, when executed, may cause the token module 438 to determine whether the first token 440 is associated with the token chain 436. In the illustrated example of FIG. 4B, the first token 440 (e.g., token [1]) is associated with the token chain 436 (e.g., token [1], 2, . . . N), such that the first server 434 is authenticated. Thereafter, the first server 436 may forward or otherwise transmit the data communication to a second server 442.

The second server 442 receives the token chain 436 (e.g., token 1, 2, . . . N) within the data communication. The example second server 442 may comprise a corresponding token module 444, which may comprise a second token 446 (e.g., token 2). As described herein, the instructions in the data communications, when executed, may cause the token module 444 to determine whether the second token 446 is associated with the token chain 436. In the illustrated example of FIG. 4B, the second token 446 (e.g., token [2]) is associated with the token chain 436 (e.g., token 1, [2], . . . N), such that the second server 442 is authenticated. Thereafter, the second server 442 may forward or otherwise transmit the data communication to a $n^{th}$ server 448.

As described herein, the $n^{th}$ server 448 may receive the token chain 436 (e.g., token 1, 2, . . . N) in the data communication. The example $n^{th}$ server 448 may comprise a corresponding token module 450, which may comprise a $N^{th}$ token 452 (e.g., token N) and. As described herein, the instructions in the data communications, when executed, may cause the token module 452 to determine whether the $N^{th}$ token 452 is associated with the token chain 436. In the illustrated example of FIG. 4B, the $N^{th}$ token 452 (e.g., token [N]) is associated with the token chain 436 (e.g., token 1, 2, . . . [N]), such that the $n^{th}$ server 448 is authenticated.

As described above, the same token chain is used to authenticate each network device (e.g., first server 434, second server 442, $n^{th}$ server 448). In an embodiment, the token chain 436 may define a particular data path that a data communication is to travel through between the first computing device 102 and the second computing device 104. In such an embodiment, if the data communications traverse a different data path, the receiving network devices may be unauthorized and the data may be destructed, as disclosed herein. Of course, any number of token chains may be utilized such that a plurality of data paths may be predefined.

As noted above, when a particular computing device, node, server, network element, or other entity does not comprise a corresponding token module 310 and/or does not comprise a token that is associated with a token or token chain within a received data communication, the instructions within the data communications, when executed (e.g., by the entity when attempting to process the data communication), may cause the data communication to self-destruct, thereby preventing the processing of the data communications by an unauthorized entity. As disclosed herein, the instructions may further cause a report to be generated acknowledging destruction of a data communication or authentication of an entity.

In some examples, the data communications may be destined for more than one other computing device. In such examples, the data communications may be broken into discrete data block with a corresponding token for each data block. Accordingly, authentication can be more narrowly defined to a particular data block of a data communication rather than the entire data communication. In such an example, only the parties authorized for each data block may process those data blocks. For example, the data communications may be sent to both the second computing device 104 and a third computing device. However, only the first half of the data communications may be authenticated for the second computing device 104 and only the second half of the data communications may be authenticated for the third computing device.

Additionally, each token for each data block may be considered as a piecemeal portion of a complete token. In other words, an entity that comprises the complete token may be able to process the entire data communication whereas an entity that comprises a piecemeal token for one data block may be able to process that one data block. Thus, a single data communication may be broken into multiple portions with multi-tiered authentication for one or more parties.

Additionally, or alternatively, after a data communication sent from the first computing device 102 arrives at the second computing device 104, the second computing device 104 may edit, alter, process, and/or forward the data communication to a third computing device as disclosed herein. In such an example, the second computing device 104 may establish a secure relationship with the third computing device separate from the secure relationship with the first computing device. However, in such examples, the third computing device may not be authenticated for portions of the data communication corresponding to the secure relationship between the first computing device 102 and the second computing device 104. In other words, the third computing device may be authorized for the edits, alterations, processing of the data communication performed by the second computing device 104. Of course, the third computing device may be authorized by the first computing device upon request by the second computing device 104 or the third computing device, and authentication may be performed as described above with respect to the multi-tiered authentication.

Figure 5:
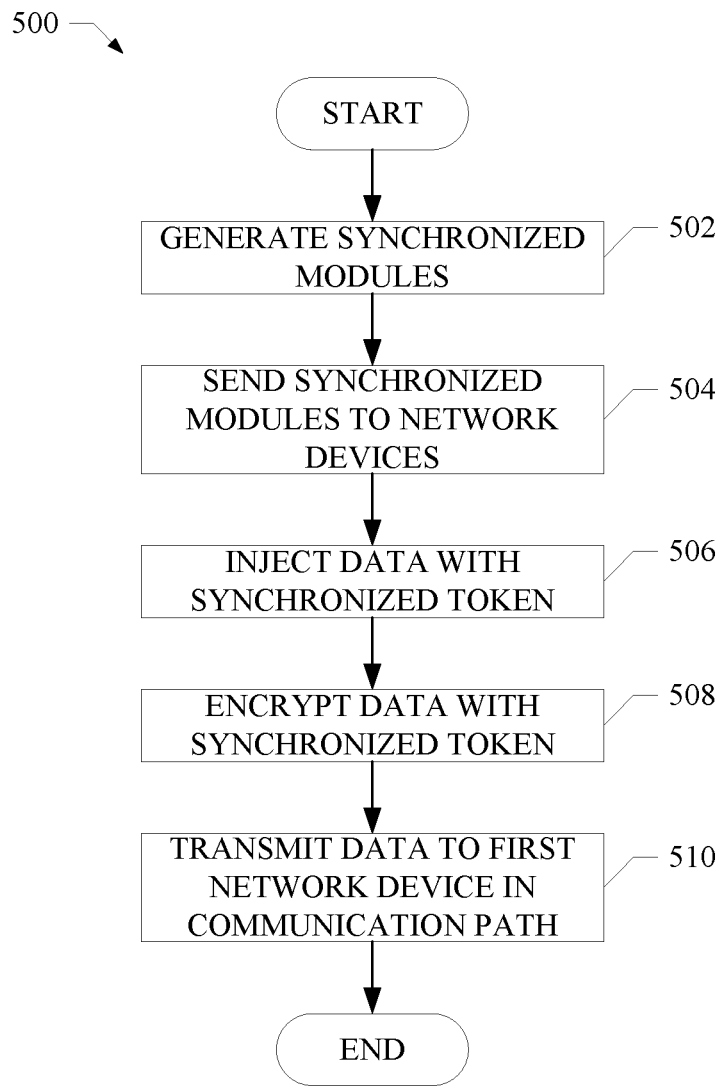
FIGS. 5-7 illustrate flowcharts representative of processes that may be implemented as computer readable instructions executable by the example computing device of FIG. 3.

FIG. 5 illustrates a flowchart representative of machine readable instructions that, when executed, may cause a computing device to implement an example process 500 to set up a secure relationship between computing devices. The example process 500 begins execution at block 502. At block 502, the example token modules (e.g., token module 310) are generated. As disclosed herein, for each computing device of a plurality of computing devices involved with transmission of the data communications, a corresponding token module 310 with tokens synchronized across the plurality of computing devices are distributed (block 504). Such token modules 310 may be installed at each computing device (e.g., the first computing device 102, the second computing device, the nodes 106, etc.) to authorize the computing devices to receive and process the data communications. At block 506, the first computing device 102 injects a token within data for transmission to the second computing device 104. Once the data includes the token, the example first computing device 102 may encrypt the data with the token (block 508). At block 510, the first computing device 102 transmits the data as a data communication across the network 309 (e.g., mesh network 100) towards the second computing device 104. A first network device or node 106 may receive the data communication as part of a communication path to the second computing device. In some examples, the first network device or node 106 is an authorized system. In some examples, the first network device or node 106 is an unauthorized system. Thereafter, the example process 500 ceases operation.

Figure 6:
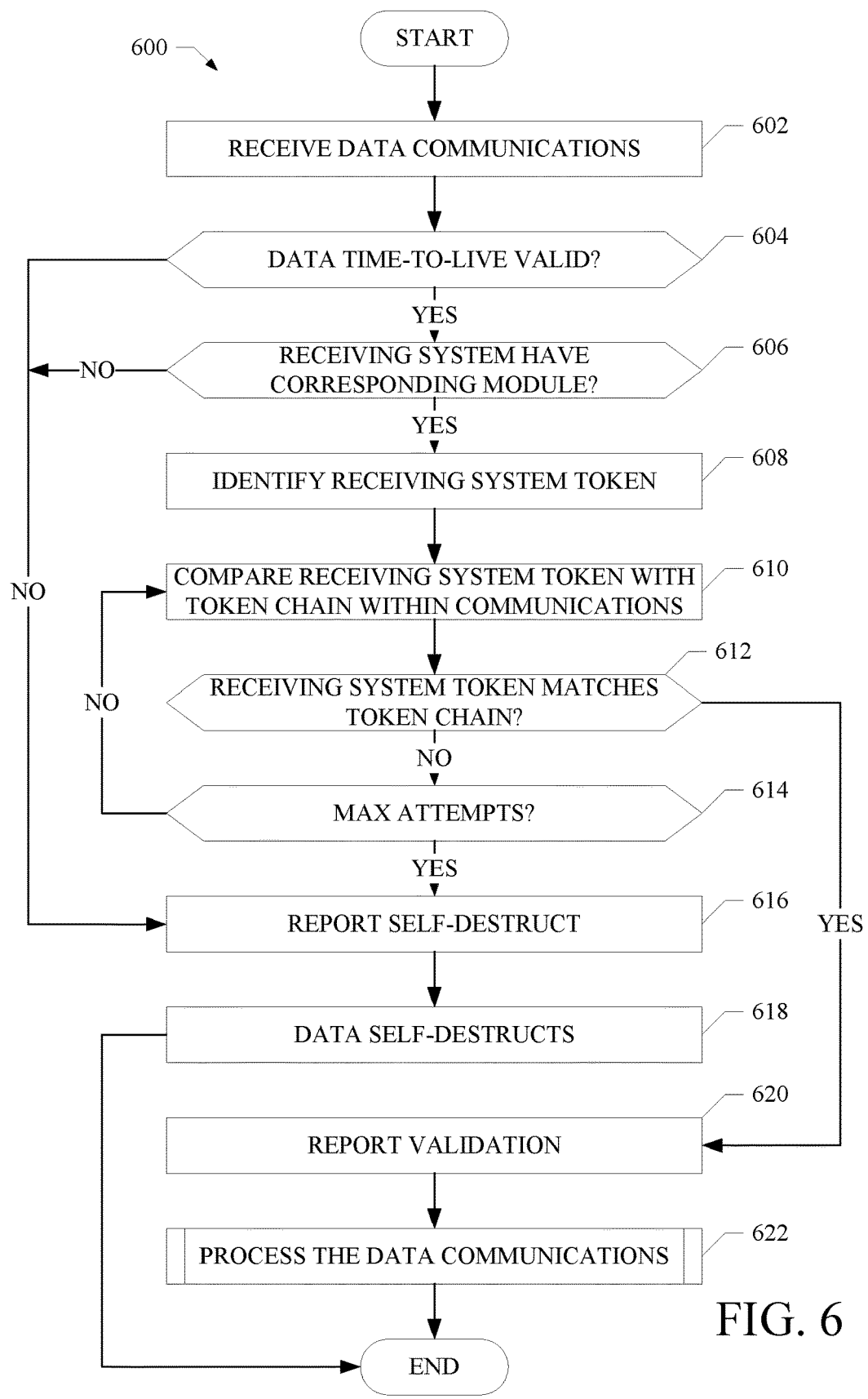

FIG. 6 illustrates a flowchart representative of machine readable instructions that, when executed, may cause a computing device to implement an example process 600 to validate computing devices. The example process 600 begins execution at block 602. At block 602, the computing device, such as, for example, the first node 106*a*, receives data communications. In some examples, the data communications are sent from the first computing device 102. As disclosed herein, the example data communications may comprise instructions that may be executed when the first node 106*a* attempts to access the data communications. In some examples, the example instructions, when executed, may cause the first node 106*a* to determine whether the first node 106*a* comprises a token module 310 corresponding to the data communications (block 604). If the first node 106*a* comprises a token module 310 corresponding to the data communications (block 604: YES), control proceeds to block 606.

In some examples, the instructions, when executed, may cause the token module 310 (FIG. 3) of the first node 106*a* to determine whether the TTL parameter of the data communications is valid (block 606). For example, the TTL parameter may be set to expire at a particular date and/or time. If the example token module 310 determines that the TTL parameter of the data communications is valid (block 606: YES), control proceeds to block 608.

At block 608, the example instructions, when executed, may cause the first node 106*a* to identify the token, if any, stored by the token module 310. The example token module 310 may compare the stored token with one or more tokens stored within the data communications (block 610). In some examples, the token module 310 searches the data communications for a token that matches (e.g., partially or completely) the stored token to determine whether the stored token is associated with the one or more tokens stored in the data communications. In some examples, the data communications are encrypted with a token (e.g., block 508, FIG. 5). In such examples, the token module 310 may attempt to decrypt the data communications with the stored token. Upon successful decryption, the example token module 310 may determine the stored token is associated with the one or more tokens stored in the data communications. Upon unsuccessful decryption, the example token module 310 may determine the stored token is not associated with the one or more tokens stored in the data communications.

If the stored token is not associated with the one or more tokens stored in the data communications (block 612: YES), control proceed to block 614. At block 614, the example token module determines whether a maximum number of attempts to validate the first node 106 have been met. A first attempt to validate may fail for any number of reasons. For example, an otherwise authorized system may be in an error state, search for an incorrect token within a number of stored tokens, etc. However, multiple unsuccessful attempts to validate is likely due to an unauthorized system attempting to access the data communications. If the token module 310 determines the maximum number of attempts to validate the first node 106*a* has not been met (block 614: NO), control returns to block 610.

If the first node 106*a* does not comprise a token module 310 corresponding to the data communications (block 604: NO); if the first node 106*a* does comprise a token module 310 corresponding to the data communications (block 604: YES) and the example token module 310 determines that the TTL parameter of the data communications is not valid (e.g., has expired) (block 606: NO); or if the token module 310 determines the maximum number of attempts to validate the first node 106*a* has been met (block 614: YES), control proceeds to block 616.

At block 616, the example instructions, when executed, may cause the first node 106*a* to report that the data communications have self-destructed. In some examples, the first node 106*a* reports the self-destruction to the first computing device 102 and/or the second computing device 104. In some examples, the first node 106*a* reports the self-destruction to a remote computing device. At block 618, the example instructions, when executed, may cause the first node 106*a* to destruct the data communications such that the data communications are irrecoverable.

Returning to block 612, if the stored token is associated with the one or more tokens stored in the data communications (block 612: YES), control proceed to block 620. At block 620, the example instructions, when executed, may cause the first node 106*a* to report that the data communications have be validated at the first node 106. In some examples, the first node 106*a* reports the validation to the first computing device 102 and/or the second computing device 104. In some examples, the first node 106*a* reports the validation to a remote computing device. At block 622, the example instructions, when executed, may cause the first node 106*a* to process the data communications as described herein. After blocks 618 or 622, the example process 600 ceases operation.

Figure 7:
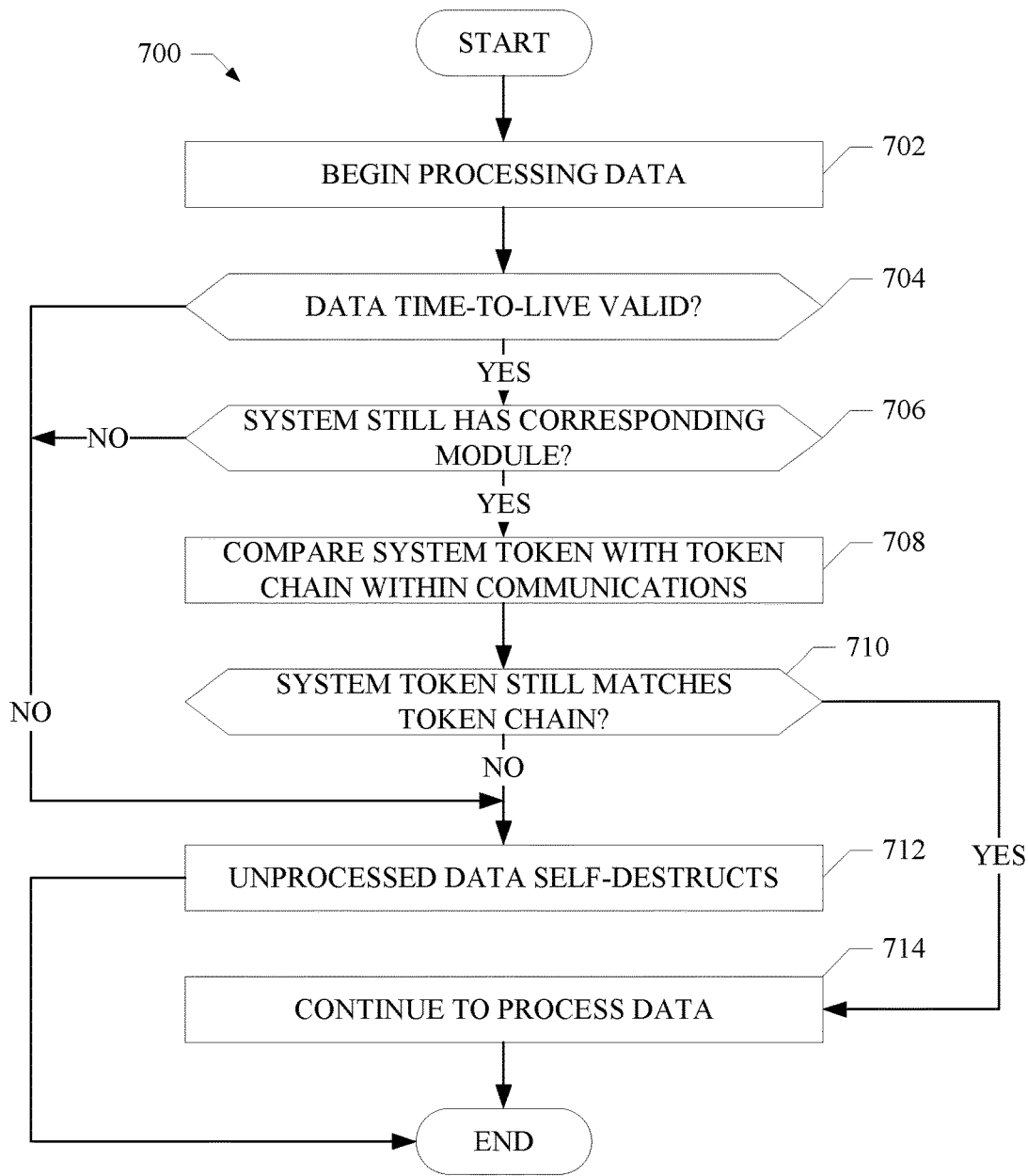

FIG. 7 illustrates a flowchart representative of machine readable instructions that, when executed, may cause a computing device to implement an example process 700 to process data communications. The example process 700 begins execution at block 702. At block 702, the computing device, such as, for example, the first node 106*a*, may begin processing the data communications. However, the TTL parameter of the data communications may expire, the example token module may be destroyed or reset, and/or the stored token may become invalid at any time. Accordingly, the instructions, when executed, may cause the first node 106*a* to make numerous checks while processing the data communications. For example, the first node 106*a* may determine whether the token module 310 corresponding to the data communications still exists on the first node 106*a* (block 704). If the first node 106*a* still comprises the token module 310 (block 704: YES), control proceeds to block 706.

At block 706, the instructions, when executed, may cause the example token module 310 of the first node 106*a* to determine whether the TTL parameter of the data communications is still valid. If the example token module 310 determines that the TTL parameter of the data communications is still valid (block 706: YES), control proceeds to block 708. At block 708, the example instructions, when executed, may cause the first node 106*a* to re-compare the token in the token module 310 with the one or more tokens stored within the data communications (block 708).

If the first node 106a lacks the token module 310 (block 704: NO), if the first node 106a still comprises the token module 310 (block 704: YES), but the example token module 310 determines that the TTL parameter of the data communications is no longer valid (block 706: NO), or if the token in the token module 310 is no longer associated with the one or more tokens within the data communications (block 710: NO), control proceeds to block 712. At block 712, the example instructions, when executed, may cause the first node 106a to destruct the unprocessed portion of the data communications such that the unprocessed portion of the data communications are irrecoverable.

Returning to block 710, if the stored token is still associated with the one or more tokens stored within the data communications (block 710: YES), control proceeds to block 714. At block 714, the example first node 106a continues processing the data communications. After block 712 or 714, the example process 700 ceases operation.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:

1. A system comprising:
at least one network device configured to facilitate communications between a first computing device and a second computing device; and
at least one processor associated with the at least one network device, wherein the communications comprise instructions that, when executed by the at least one processor, cause the at least one network device to:
  determine whether the at least one network device comprises a token associated with a token chain within the communications, wherein the token chain is configured to authorize the at least one network device to process the communications, and wherein the token includes a random string of characters and the token chain defines a path of authorized systems for transmission through a network;
  in response to determining that the token is associated with the token chain, process the communications; and
  in response to determining that the token is not associated with the token chain, destruct the communications.

2. The system of claim 1, wherein the first computing device comprises a first module configured to use a same rotating cypher to alter the token chain and the at least one network device comprises a second module configured to use the same rotating cypher to alter the token.

3. The system of claim 1, wherein the instructions, when executed, further cause the at least one network device to, in response to determining that the token is not associated with the token chain, record a network address of the at least one network device.

4. The system of claim 1, wherein the instructions, when executed, further cause the at least one network device to, in response to determining that a first portion of the token is associated with the token chain and a second portion of the token is not associated with the token chain, partially process the communications.

5. The system of claim 1, wherein the token is a first token and wherein the at least one network device comprises a module configured to insert, into the communications and in response to determining that the first token is associated with the token chain, a second token.

6. The system of claim 5, wherein the second computing device is configured to:
determine whether the second computing device comprises a third token associated with either the token chain or the second token;
in response to determining that the second token is associated with either the token chain or the second token, process the communications; and
in response to determining that the second token is not associated with either the token chain or the second token, destruct the communications.

7. An apparatus comprising:
at least one processor;
a first token configured to authorize the apparatus to receive communications from a first computing device, wherein the first token is associated with a token chain and includes a random string of characters, and wherein the token chain defines a path of authorized systems for transmission through a network;
a device controller configured to receive, from the first computing device, the communications; and
wherein the communications comprise instructions, that when executed by the at least one processor, cause the apparatus to:
  determine whether the first token matches a second token within the communications;
  in response to determining that the first token matches the second token:
    insert a third token into the communications, wherein the third token is configured to authorize a second computing device to receive the communications from the apparatus; and
    forward the communications to the second computing device; and
  in response to determining that the first token fails to match the second token, destruct the communications.

8. The apparatus of claim 7, wherein the instructions, when executed by the at least one processor, cause the apparatus to insert the third token into at least one of a header or a footer of the communications.

9. The apparatus of claim 7, wherein the communications comprise a plurality of data blocks, wherein the first token comprises a plurality of data tokens, and wherein each data block of the plurality of data blocks is associated with a corresponding data token of the plurality of data tokens.

10. The apparatus of claim 7, wherein the first token comprises a time limit corresponding to how long the apparatus is authorized to receive the communications from the first computing device.

11. The apparatus of claim 7, wherein the communications are encrypted with the second token.

12. The apparatus of claim 11, wherein the instructions, when executed by the at least one processor, further cause the apparatus to:
attempt to decrypt the communications with the first token;
determine, in response to successful decryption of the communications with the first token as a decryption key, that the first token matches the second token; and
determine, in response to unsuccessful decryption of the communications with the first token as the decryption key, that the first token fails to match the second token.

13. A method comprising:
receiving, by a computing device associated with a first token, communications, wherein the first token is associated with a token chain and includes a random string of characters, and wherein the token chain defines a path of authorized systems for transmission through a network;
determining, by the computing device, whether the first token is associated with a second token within the communications, wherein the second token is configured to authorize the computing device to process the communications;
processing, by the computing device and in response to determining that the first token is associated with the second token, the communications; and
destructing, by the computing device and in response to determining that the first token is not associated with the second token, the communications.

14. The method of claim 13, further comprising initializing the first token and the second token with a same rotating cypher.

15. The method of claim 13, further comprising inserting, into the communications and in response to determining that the first token is associated with the second token, a third token.

16. The method of claim 13, wherein the second token comprises at least one data token, further comprising, processing, by the computing device and in response to determining that the first token is associated with the at least one data token, a portion of the communications corresponding to the at least one data token.

17. The method of claim 13, wherein the computing device is a first computing device and wherein the processing the communications comprises at least one of decrypting the communications, reading the communications, editing the communications, encrypting the communications, forwarding the communications to a second computing device, or any combination thereof.

18. The method of claim 17, wherein the communications are from the second computing device.

19. The method of claim 13, wherein the communications are first communications, the method further comprising:
receiving, by the computing device, second communications;
determining, by the computing device, whether a third token stored by the computing device is associated with a fourth token within the second communications, wherein the fourth token is configured to authorize the computing device to process the second communications;
processing, by the computing device and in response to determining that the third token is associated with the fourth token, the second communications; and
destructing, by the computing device and in response to determining that the third token is not associated with the fourth token, the second communications.

20. The method of claim 19, further comprising, prior to determining whether the first token is associated with the second token within the first communications:
determining, by the computing device and, whether the third token stored by the computing device is associated with the second token within the first communications;
processing, by the computing device and in response to determining that the third token is associated with the second token, the first communications; and
increasing, by the computing device and in response to determining that the third token is not associated with the second token, a maximum attempt counter; and
wherein the determining whether the first token is associated with the second token within the first communications occurs in response to the increasing the maximum attempt counter.

* * * * *